United States Patent
Steinebach et al.

(10) Patent No.: US 10,202,091 B2
(45) Date of Patent: Feb. 12, 2019

(54) CAST BUMPER SYSTEM AND METHOD OF MANUFACTURING SAME

(71) Applicants: Edward K. Steinebach, Oak Ridge, TN (US); Jeffrey Jay Mellis, Bloomfield Hills, MI (US); Jeremiah John Brady, Knoxville, MI (US); Richard Lee Winfree, Knoxville, TN (US)

(72) Inventors: Edward K. Steinebach, Oak Ridge, TN (US); Jeffrey Jay Mellis, Bloomfield Hills, MI (US); Jeremiah John Brady, Knoxville, MI (US); Richard Lee Winfree, Knoxville, TN (US)

(73) Assignee: Magna International Inc., Aurora, Ontario (CA)

( * ) Notice: Subject to any disclaimer, the term of this patent is extended or adjusted under 35 U.S.C. 154(b) by 85 days.

(21) Appl. No.: 15/386,135

(22) Filed: Dec. 21, 2016

(65) Prior Publication Data

US 2017/0106822 A1 Apr. 20, 2017

Related U.S. Application Data (63) Continuation-in-part of application No. 15/319,878, filed as application No. PCT/US2015/039596 on Jul. 8, 2015.

(Continued)

(51) Int. Cl.
*B60R 19/03* (2006.01)
*B60R 19/18* (2006.01)
(Continued)

(52) U.S. Cl.
CPC ............ *B60R 19/03* (2013.01); *B22D 25/02* (2013.01); *B23K 31/02* (2013.01); *B60R 19/18* (2013.01);
(Continued)

(58) Field of Classification Search
CPC ....... B60R 19/02; B60R 19/023; B60R 19/03; B60R 19/18; B60R 19/26; B60R 19/34
(Continued)

(56) References Cited

U.S. PATENT DOCUMENTS 6,318,775 B1   11/2001   Heatherington et al.
6,338,510 B1 *  1/2002   Kanamori ............... B60R 19/26
                                                         293/154

(Continued)

FOREIGN PATENT DOCUMENTS

EP    1640147 A1    3/2006
EP    2284045 A1    2/2011
(Continued)

OTHER PUBLICATIONS

International Search Report; PCT/US2017/067934; dated Feb. 15, 2018; 7 pages.

*Primary Examiner* — Jason S Daniels
(74) *Attorney, Agent, or Firm* — Dickinson Wright PLLC (57) ABSTRACT

A bumper beam system is provided that includes a bumper beam that is cast from metal and has at least a first portion comprised of a first alloy and a second portion comprised of a second alloy that is different than the first alloy. Furthermore, a crash box is provided that comprises a first portion comprised of a first alloy and a second portion comprised of a second alloy that is different than the first alloy. Additionally, a bumper beam system is provided that has a bumper beam and a crash box. The bumper beam includes at least a first bumper beam portion that is comprised of a first bumper (Continued)

beam alloy, and the crash box includes at least a first crash box portion that is comprised of a first crash box alloy. Methods of manufacturing the bumper beam system and crash boxes are also provided.

24 Claims, 10 Drawing Sheets

Related U.S. Application Data (60) Provisional application No. 62/022,366, filed on Jul. 9, 2014.

(51) Int. Cl.
  B60R 19/34 (2006.01)
  B22D 25/02 (2006.01)
  B23K 31/02 (2006.01)
  B23K 101/00 (2006.01)
  B23K 101/28 (2006.01)
  B23K 103/04 (2006.01)

(52) U.S. Cl.
  CPC ........ B60R 19/34 (2013.01); *B23K 2101/006* (2018.08); *B23K 2101/28* (2018.08); *B23K 2103/04* (2018.08); *B60R 2019/1813* (2013.01)

(58) Field of Classification Search
  USPC .................................................. 293/132, 133
  See application file for complete search history.

(56) References Cited

U.S. PATENT DOCUMENTS

| | | | |
|---|---|---|---|
| 6,969,548 | B1 | 11/2005 | Goldfine |
| 7,390,038 | B2 | 6/2008 | Campbell et al. |
| 7,837,230 | B2 | 11/2010 | Mellis et al. |
| 7,959,197 | B2 | 6/2011 | Agrahari et al. |
| 8,496,258 | B2 * | 7/2013 | Werner .................. B22D 19/00 280/124.116 |
| 9,156,417 | B2 * | 10/2015 | Mori ....................... B60R 19/34 |
| 2003/0057692 | A1 | 3/2003 | Horsch et al. |
| 2004/0262931 | A1 * | 12/2004 | Roussel .................. B60R 19/18 293/120 |
| 2005/0104392 | A1 | 5/2005 | Liebhard et al. |
| 2007/0056819 | A1 | 3/2007 | Kano et al. |
| 2007/0114804 | A1 | 5/2007 | Gross et al. |
| 2007/0271793 | A1 | 11/2007 | Mellis et al. |
| 2008/0012386 | A1 | 1/2008 | Kano et al. |
| 2008/0308196 | A1 | 12/2008 | Chung |
| 2009/0026799 | A1 | 1/2009 | Garilov |
| 2010/0126813 | A1 | 5/2010 | Hayashi |
| 2011/0187135 | A1 | 8/2011 | Kano et al. |
| 2012/0025547 | A1 | 2/2012 | Haneda et al. |
| 2012/0205927 | A1 | 8/2012 | Asakawa et al. |
| 2013/0157073 | A1 | 6/2013 | Charest et al. |
| 2013/0234456 | A1 | 9/2013 | Brockhoff et al. |

FOREIGN PATENT DOCUMENTS

| | | |
|---|---|---|
| JP | 2008296716 A | 12/2008 |
| JP | 2010120026 A | 6/2010 |
| JP | 2011179579 A | 9/2011 |
| WO | 2016007661 A1 | 1/2016 |

* cited by examiner

CAST BUMPER SYSTEM AND METHOD OF MANUFACTURING SAME

CROSS REFERENCE TO RELATED APPLICATIONS

This patent application is a Continuation-In-Part of U.S. patent application Ser. No. 15/319,878 filed on Dec. 19, 2016, which claims priority to PCT International Patent Application Serial No. PCT/US2015/039596 filed on Jul. 8, 2015, which claims the benefit of and priority to U.S. Provisional Patent Application Ser. No. 62/022,366 filed Jul. 9, 2014, the entire disclosure of these applications being considered part of the disclosure of this application, and hereby incorporated by reference.

BACKGROUND OF THE INVENTION

1. Field of the Invention

The subject invention is related to a vehicle bumper system including a bumper beam and a crash box. The subject invention is also related to a method of manufacturing the bumper system.

2. Description of the Prior Art

Vehicle bumper assemblies are known for providing energy absorbing characteristics. Body structures of a vehicle are provided with so-called crash boxes. Such crash boxes are disposed on the end of a frame member of a vehicle body structure so as to absorb an impact load of certain predetermined value, thereby eliminating deformation of the frame member of the vehicle body.

Bumper assemblies include a bumper beam typically extending laterally across the front or rear of a vehicle and provided generally for absorbing energy during a frontal or rear impact. Such bumper beams are disposed under a cosmetic or fascia bumper and are mounted to a vehicle frame with use of the so-called crash boxes referred to above. The crash-boxes are designed to fold upon such frontal or rear impacts.

The crash boxes are mounted to the vehicle frame and the bumper beam by many different means including, without limitation, welding, adhesives, fasteners, etc. Such crash boxes and bumper beams can be made of many different types of materials including, without limitation, steel, aluminum, and/or magnesium. In addition, such crash boxes and bumper beams are manufactured by way of extrusion, steel roll forming, or hot stamping manufacturing processes.

There remains a significant and continuing need for a design of a crash box and bumper beam that allows for lower manufacturing and assembling costs along with improved energy absorption properties. There also remains a significant and continuing need for an improved method of manufacturing a vehicle bumper system which is cost effective, reduces manufacturing steps, and also able to produce an assembled product having improved energy absorption and other performance properties.

SUMMARY OF THE INVENTION

The subject invention includes a bumper beam system including a bumper beam that is cast from metal and has at least a first portion comprised of a first alloy and a second portion comprised of a second alloy that is different than the first alloy. The subject invention also includes a method of manufacturing a bumper beam system that comprises metal casting a bumper beam having at least a first portion comprised of a first alloy and a second portion comprised of a second alloy that is different than the first alloy.

The subject invention further includes a crash box comprising at least a first portion and a second portion that are each integrally cast from metal. The first portion is comprised of a first alloy and the second portion is comprised of a second alloy that is different than the first alloy. The subject invention also includes a method of manufacturing a crash box that includes integrally metal casting a first portion and a second portion of the crash box, wherein the first portion of the crash box is comprised of a first alloy and the second portion of the crash box is comprised of a second alloy that is different than the first alloy.

The subject invention further includes a bumper beam system having a bumper beam and a crash box that are each integrally cast from metal. The bumper beam includes at least a first bumper beam portion that is comprised of a first bumper beam alloy, and the crash box includes at least a first crash box portion comprised of a first crash box alloy that is different than the first bumper beam alloy. The subject invention also includes a method of manufacturing a bumper system that comprises metal casting a bumper beam and a crash box integrally with one another, wherein the bumper beam includes a first bumper beam portion comprised of a first bumper beam alloy, and the crash box includes a first crash box portion comprised of a first crash box alloy that is different than the first bumper beam alloy.

A bumper system or crash box according to the subject invention is advantageous because making the bumper system or crash box of different alloys allows different regions or portions of the bumper system or crash box to be specialized for predetermined performance and mass characteristics. For example, a first region or portion of the bumper system and/or crash box intended to crush during an impact can be comprised of an alloy that has excellent crush and energy absorbing characteristics, and a second region or portion intended to transfer energy during an impact can be comprised of an alloy that has higher strength and different energy absorbing characteristics.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
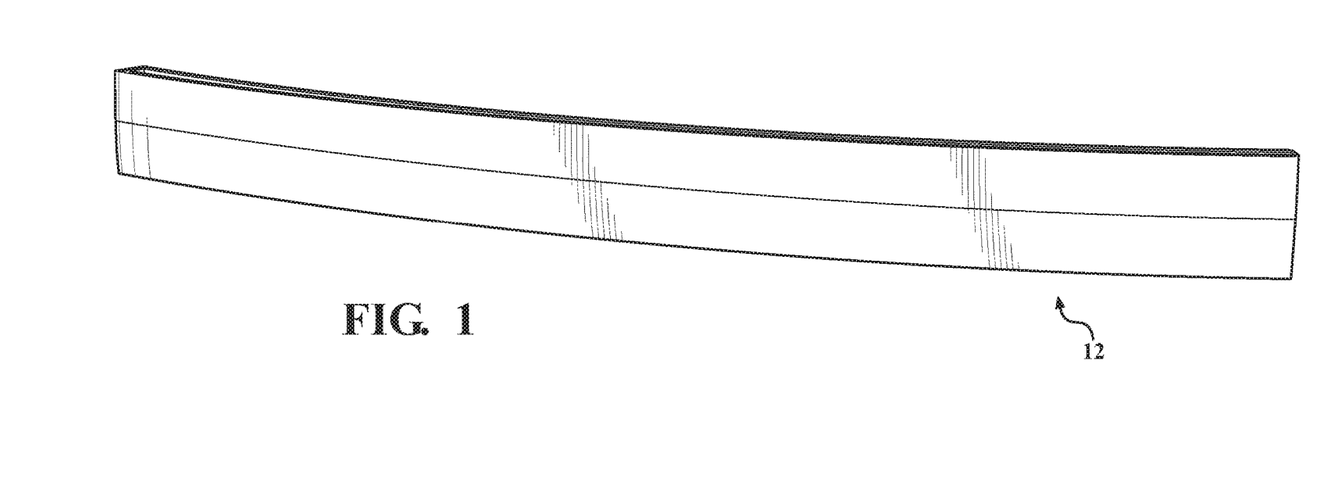
FIG. 1 is a perspective view of a cast bumper beam.

Referring to the Figures, wherein like numerals indicate corresponding parts throughout the several views, FIG. 1 is a perspective view of a cast bumper beam, shown generally at 12, for use in a vehicle bumper system/assembly. Such vehicle bumper assemblies are known for providing energy absorbing characteristics, and the cast bumper beam 12 typically extends laterally across the front or rear of a vehicle (not shown) and is mounted to a vehicle frame with use of the crash boxes. The cast bumper beam 12 is cast from metal materials, such as aluminum or magnesium, and has a specific design of geometry that can be tuned to meet the energy absorbance and weight requirements for the overall bumper system (not expressly shown). However, other types of metal and/or metal alloys may be selected without departing from the scope of the subject disclosure. Although not expressly shown, the cast bumper beam 12 can have variable, non-constant sections with regard to width, geometry, and/or thickness.

Figure 2:
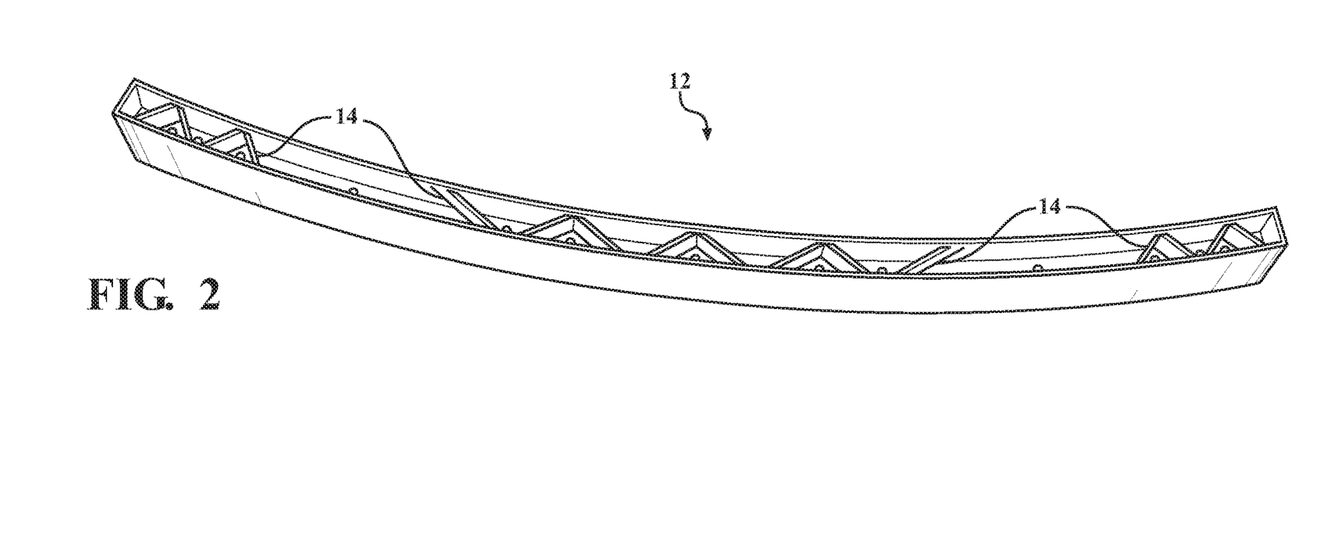
FIG. 2 is a top view of the cast bumper beam illustrating a plurality of reinforcement ribs integrally cast therewith.
Figures 3, 4:
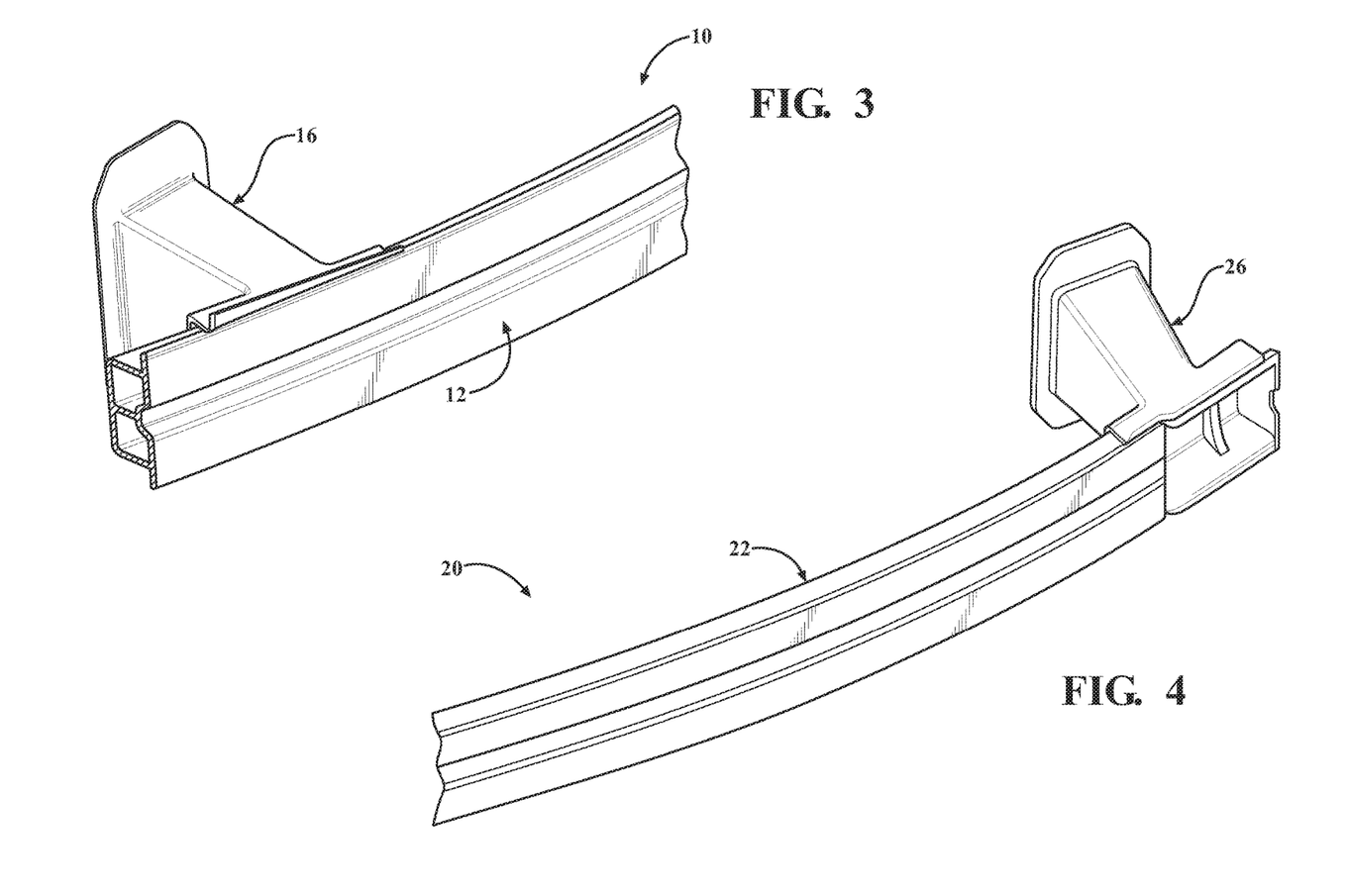
FIG. 3 is a perspective view of a first embodiment of the bumper system illustrating the cast bumper beam secured to a crash box.
FIG. 4 is a perspective view of a second embodiment of the bumper system illustrating a cast crash box secured to a bumper beam.

As best shown in FIG. 2, the cast bumper beam 12 can include a plurality of reinforcing ribs 14 having a "V" shape that are each cast integrally with the bumper beam 12 and arranged to facilitate controlled crash properties for the overall bumper system (not expressly shown). It should be appreciated that the "V"-shaped reinforcing ribs 14 could also be any number of other shapes depending on the design criteria selected including, without limitation, the amount of structural support desired, weight, and/or the amount of desired crush. As best shown in FIG. 3, the cast bumper beam 12 can be mounted to or combined with a crash box 16 that is manufactured according to traditional manufacturing processes, such as extrusion, steel roll forming, hot stamping, or the like, to form a first embodiment of the bumper system, generally shown at 10. In a preferred arrangement, the cast bumper beam 12 is welded to the crash box 16, however many other different means, including, without limitation, adhesives, fasteners, or the like, can also be used without departing from the scope of the subject disclosure.

FIG. 4 illustrates a second embodiment of the bumper system, shown generally at 20, in which a cast crash box 26 is be mounted to or combined with a bumper beam 22 manufactured according to traditional manufacturing processes, such as extrusion, steel roll forming, hot stamping, or the like. The cast crash box 26 is cast from metal materials, such as aluminum or magnesium, and has a specific design of geometry that can be tuned to meet the energy absorbance and weight requirements for the overall bumper system 20. However, other types of metal and/or metal alloys may be selected without departing from the scope of the subject disclosure. Similar to the first embodiment, the cast crash box 26 can be welded to the bumper beam 22, however many other different means, including, without limitation, adhesives, fasteners, or the like, can also be used without departing from the scope of the subject disclosure.

Figure 5:
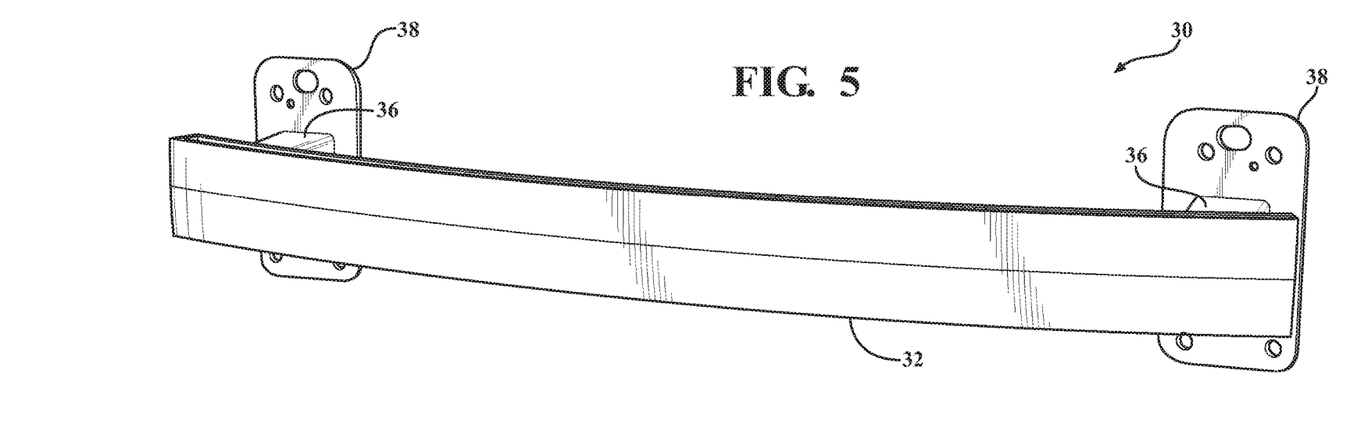
FIG. 5 is a perspective view of a third embodiment of the bumper system illustrating a cast bumper beam integral with a cast crash box.

FIG. 5 illustrates a third embodiment of the bumper system, shown generally at 30, which includes a cast bumper beam 32 integral with a cast crash box 36. Put another way, in the third embodiment of the bumper system 30, the cast bumper beam 32 and the cast crash box 36 are manufacturing integral with one another during the same casting process. Each of the cast bumper beam 32 and the cast crash box 36 are cast from metal materials, such as aluminum or magnesium, however, other types of metal and/or metal alloys may be selected without departing from the scope of the subject disclosure. Each of the cast bumper beam 32 and cast crash box 36 have a specific design of geometry that can be tuned to meet the energy absorbance and weight requirements for the overall bumper system 30, with one or both of these components having variable, non-constant sections with regard to width, geometry, and/or thickness.

Unlike the first and second embodiments of the bumper system 10, 20, the third embodiment of the bumper system 30 advantageously does not require a weld, adhesive, or other fastener to effectuate securement of the cast crash box 36 to the cast bumper beam 32. Accordingly, the third embodiment of the bumper system 30 reduces manufacturing steps and costs, and results in a bumper system that is stronger, cheaper, and lighter over prior art designs. In an exemplary embodiment, the bumper system 30 can be approximately 0.5 kg lighter than prior art bumper system designs.

Figure 6:
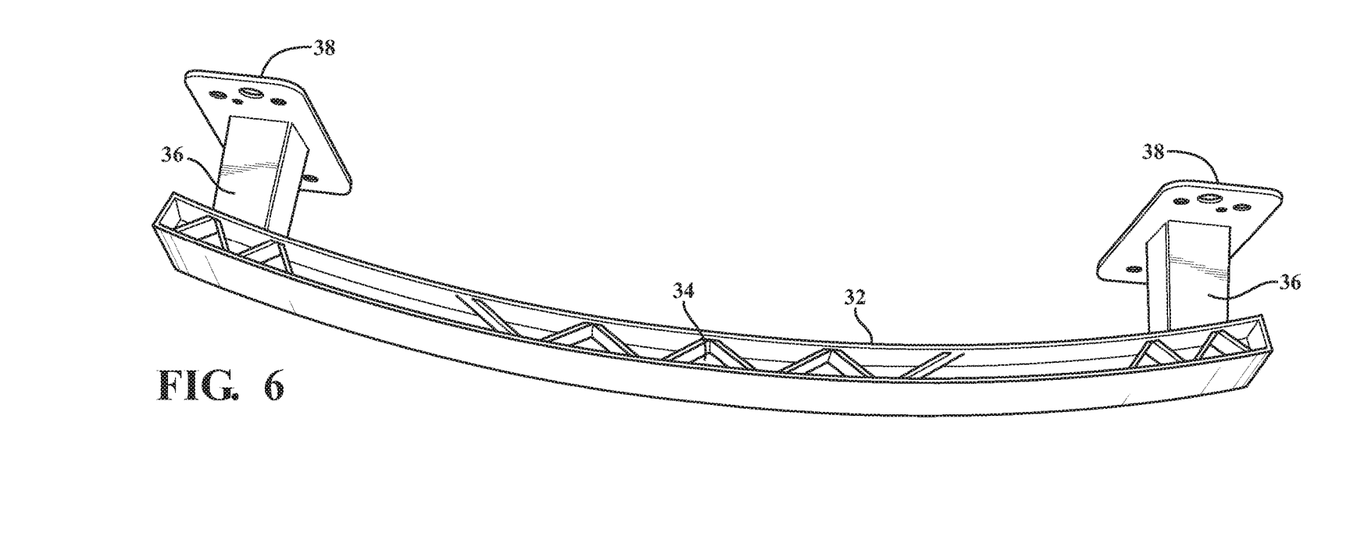
FIG. 6 is a top view of the third embodiment of the bumper system illustrating a plurality of reinforcement ribs integrally cast with the cast bumper beam.

As best shown in FIG. 5, the cast crash box 36 can also include a mounting plate 38 cast integral therewith for use in mounting the bumper system 30 to a vehicle frame (not expressly shown). As best shown in FIG. 6, the cast bumper beam 32 can also include a plurality of reinforcing ribs 34 having a "V" shape that are each cast integrally with the cast bumper beam 32 and arranged to facilitate controlled crash properties for the overall bumper system (not expressly shown). It should be appreciated that the "V"-shaped reinforcing ribs 34 could also be any number of other shapes depending on the design criteria selected including, without limitation, the amount of structural support desired, weight, and/or the amount of desired crush.

FIGS. 7A-7D illustrate a fourth embodiment of the bumper system, shown generally at 40, which includes a cast bumper beam 42 integral with a cast crash box 46. Similar to the third embodiment, the cast bumper beam 42 and the cast crash box 46 of the fourth embodiment of the bumper system 40 are also manufactured integral with one another during the same casting process. Each of the cast bumper beam 42 and the cast crash box 46 are cast from metal materials, such as aluminum or magnesium, however, other types of metal and/or metal alloys may be selected without departing from the scope of the subject disclosure. Each of the cast bumper beam 42 and cast crash box 46 have a specific design of geometry that can be tuned to meet the energy absorbance and weight requirements for the overall bumper system 40, with one or both of these components having variable, non-constant sections with regard to width, geometry, and/or thickness. The fourth embodiment of the bumper system also advantageously does not require a weld, adhesive, or other fastener to effectuate securement of the cast crash box 46 to the cast bumper beam 42. Accordingly, the fourth embodiment of the bumper system 30 reduces manufacturing steps and costs, and results in a bumper system that is stronger, cheaper, and lighter over prior art designs.

Figures 7A, 7B, 7C, 7D:
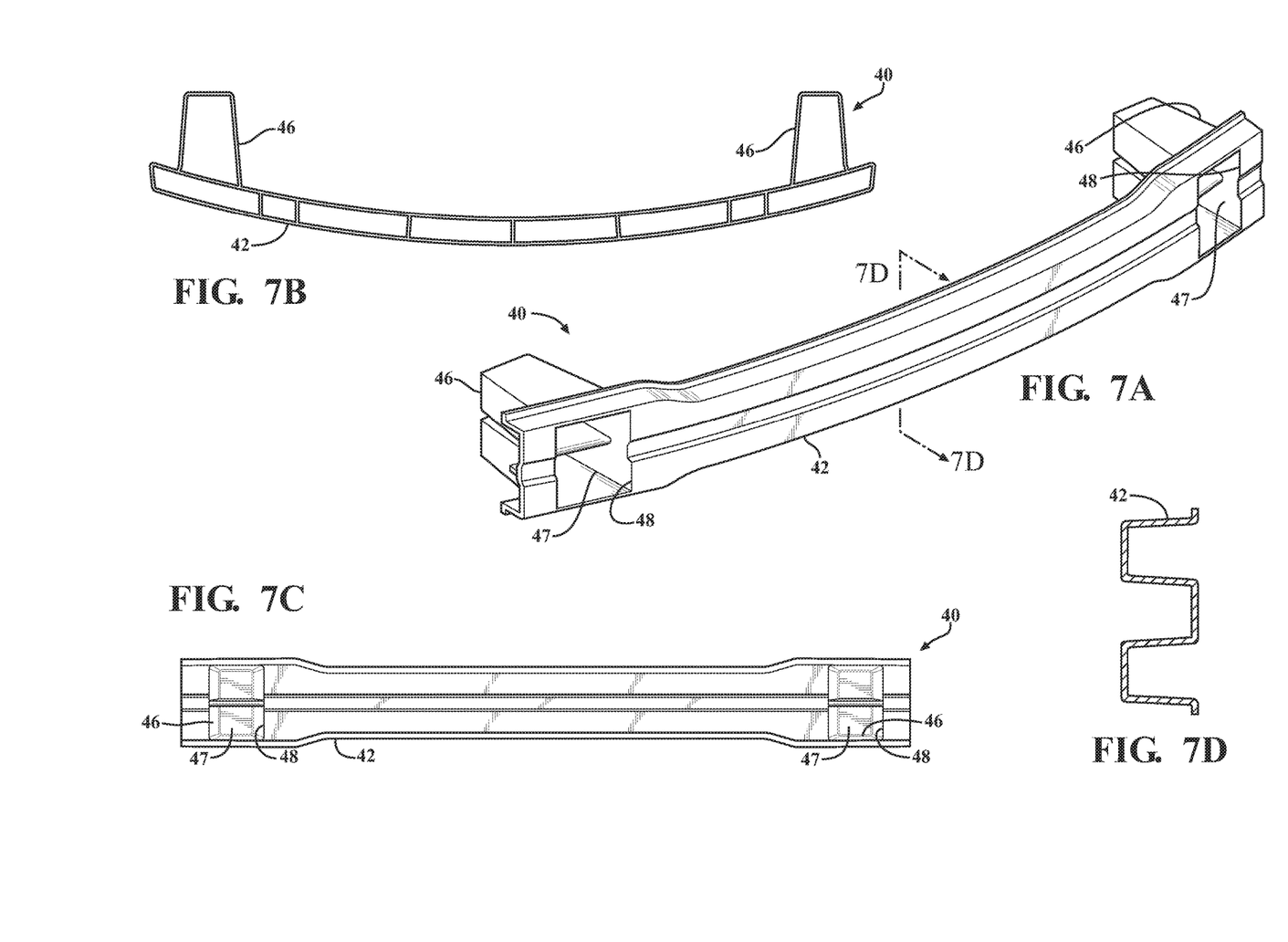
FIG. 7A is a perspective view of a fourth embodiment of the bumper system including a W-shaped cast bumper beam integral with a cast crash box.
FIG. 7B is a top view of the fourth embodiment of the bumper system.
FIG. 7C is a front view of the fourth embodiment of the bumper system.
FIG. 7D is a cross-sectional view taken along A-A of FIG. 7A.

As best shown in FIG. 7A, each of the cast crash boxes 46 define an internal cavity 47 and the cast bumper beam 42 defines a plurality of front openings 44 each disposed adjacent to and in communication with a respective internal cavity 47 of the cast crash boxes 46. The incorporation of the front openings 44 into the cast bumper beam 42 improves the manufacturability of the cast bumper system 40. As best shown in FIG. 7D, the cast bumper beam can also be cast to have a "W" shape extending along at least a portion of its length to facilitate controlled crash properties for the bumper system 40.

FIGS. 8A-8E illustrate a fifth embodiment of the bumper system, shown generally at 50, which includes a cast bumper beam 52 integral with a cast crash box 56. Put another way, similar to the third and fourth embodiments, the cast bumper beam 52 and the cast crash box 56 of the fifth embodiment of the bumper system 50 are also manufactured integral with one another during the same casting process. Each of the cast bumper beam 52 and the cast crash box 56 are cast from metal materials, such as aluminum or magnesium, however, other types of metal and/or metal alloys may be selected without departing from the scope of the subject disclosure. Each of the cast bumper beam 52 and the cast crash box 56 have a specific design of geometry that can be tuned to meet the energy absorbance and weight requirements for the overall bumper system 50, with one or both of these components having variable, non-constant sections with regard to width, geometry, and/or thickness. The fifth embodiment of the bumper system 50 also advantageously does not require a weld, adhesive, or other fastener to effectuate securement of the cast crash box 56 to the cast bumper beam 52. Accordingly, the fifth embodiment of the bumper system 50 reduces manufacturing steps and costs, and results in a bumper system that is stronger, cheaper, and lighter over prior art designs.

Figures 8A, 8B, 8C, 8D:
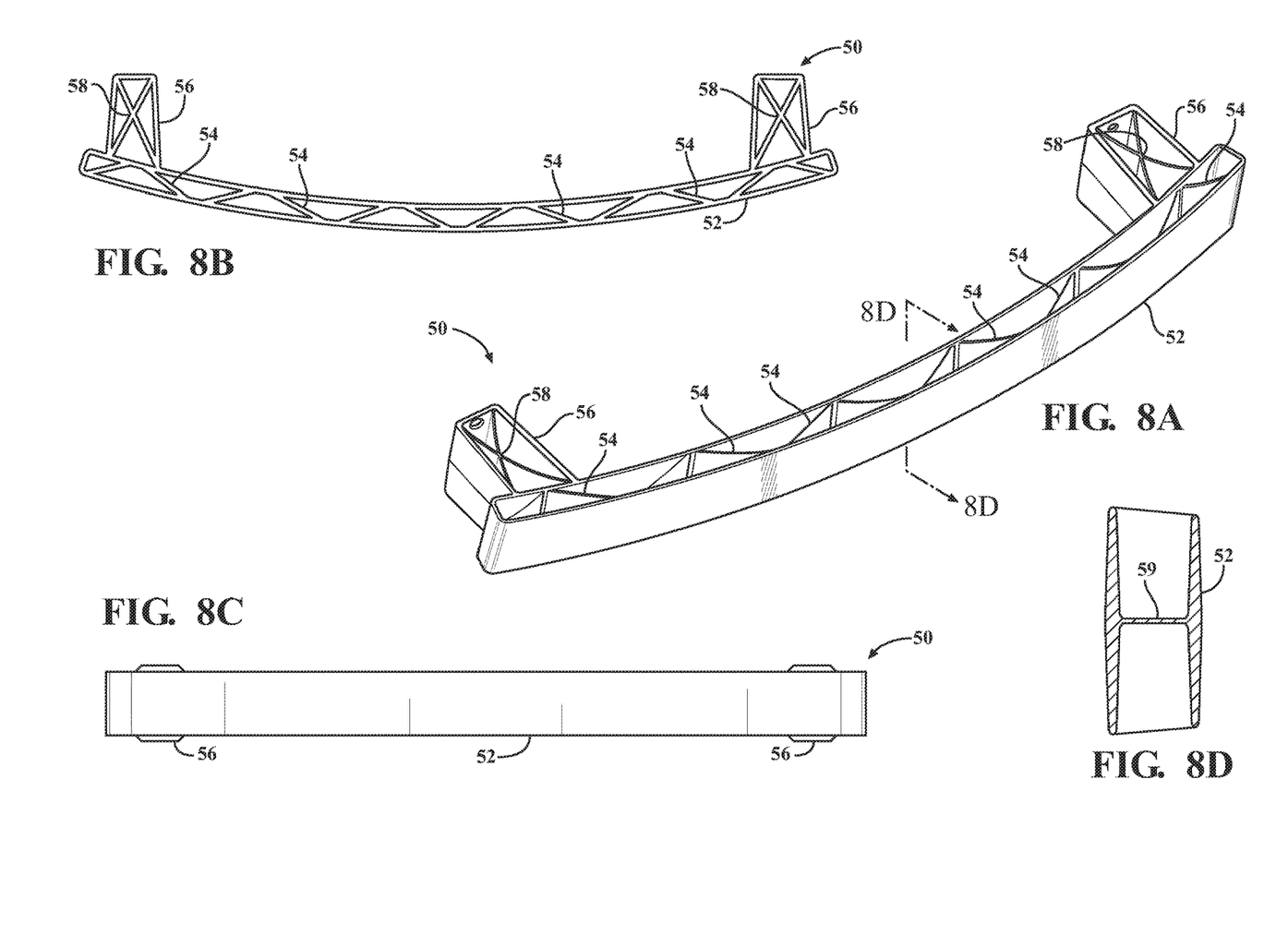
FIG. 8A is a perspective view of a fifth embodiment of the bumper system including an H-shaped cast bumper beam integral with a cast crash box and each of the cast bumper beam and cast crash box having open top and bottom surfaces.
FIG. 8B is a top view of the fifth embodiment of the bumper system.
FIG. 8C is a front view of the fifth embodiment of the bumper system.
FIG. 8D is a cross-sectional view along B-B of FIG. 8A.
Figures 8E, 9A:
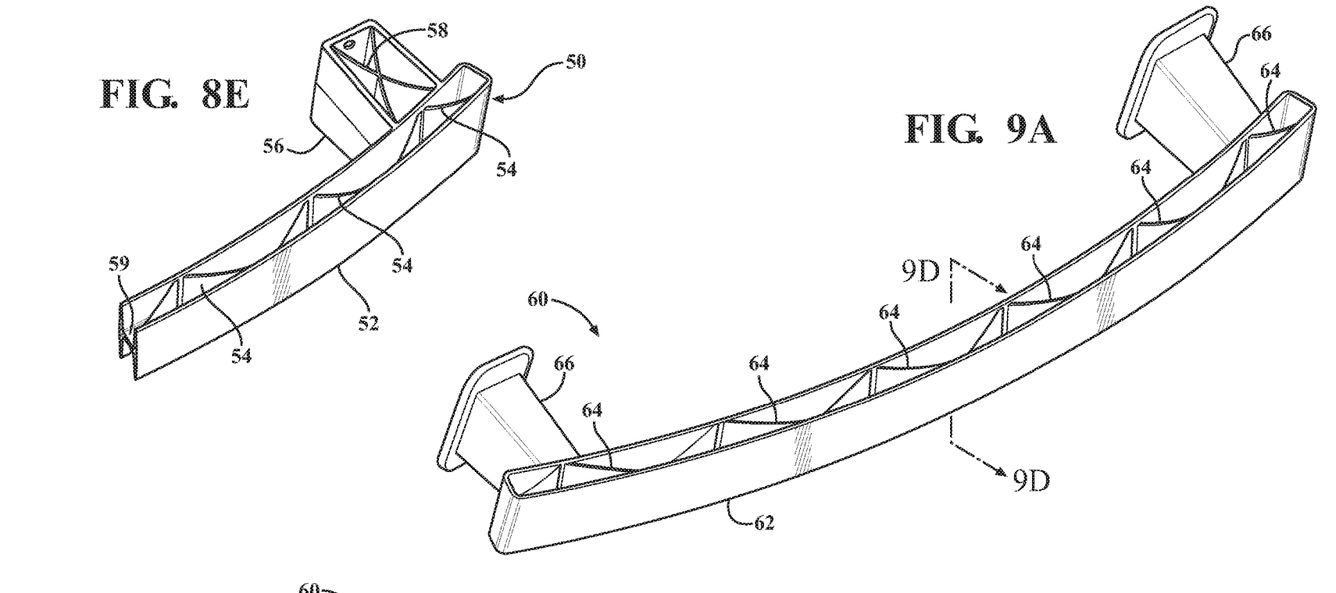
FIG. 8E is a partial perspective view of the fifth embodiment of the bumper system.
FIG. 9A is a perspective view of a sixth embodiment of the bumper system including an H-shaped cast bumper beam integral with a cast crash box having closed top and bottom surfaces.

As best shown in FIGS. 8A and 8D-8E, each of the cast bumper beam 52 and cast crash boxes 56 are open along a top and bottom portion to improve the manufacturability of the cast bumper system 50. As best shown in FIGS. 8A-8B and 8E, the cast bumper beam 52 can include a plurality of reinforcing ribs 54 having a "V" shape that are each cast integrally with the bumper beam 52 and the cast crash boxes 56 can include a plurality of reinforcing ribs 58 having an "X" shape that are each cast integrally with the crash box 56. The reinforcing ribs 54, 58 are arranged to facilitate controlled crash properties for the bumper system 50. It should be appreciated that the "V"-shaped and "X"-shaped reinforcing ribs 54, 58 could also be any number of other shapes depending on the design criteria selected including, without limitation, the amount of structural support desired, weight, and/or the amount of desired crush. As best shown in FIGS. 8D and 8E, the cast bumper beam 52 can also be cast to have an "H" shape and define an additional horizontal or transverse rib 59 extending along at least a portion of the length to further control the crash properties of the bumper system 50.

FIGS. 9A-9E illustrate a sixth embodiment of the bumper system, shown generally at 60, which includes a cast bumper beam 62 integral with a cast crash box 66. Similar to the third, fourth, and fifth embodiments, the cast bumper beam 62 and the cast crash box 66 of the sixth embodiment of the bumper system 60 are manufactured integral with one another during the same casting process. Each of the cast bumper beam 62 and the cast crash box 66 are cast from metal materials, such as aluminum or magnesium, however, other types of metal and/or metal alloys may be selected without departing from the scope of the subject disclosure. Each of the cast bumper beam 62 and cast crash box 66 have a specific design of geometry that can be tuned to meet the energy absorbance and weight requirements for the overall bumper system 60, with one or both of these components having variable, non-constant sections with regard to width, geometry, and/or thickness. The sixth embodiment of the bumper system 60 also advantageously does not require a weld, adhesive, or other fastener to effectuate securement or mounting of the cast crash box 66 to the cast bumper beam 62. Accordingly, the sixth embodiment of the bumper system 60 reduces manufacturing steps and costs, and results in a bumper system that is stronger, cheaper, and lighter over prior art designs.

Figure 9B:
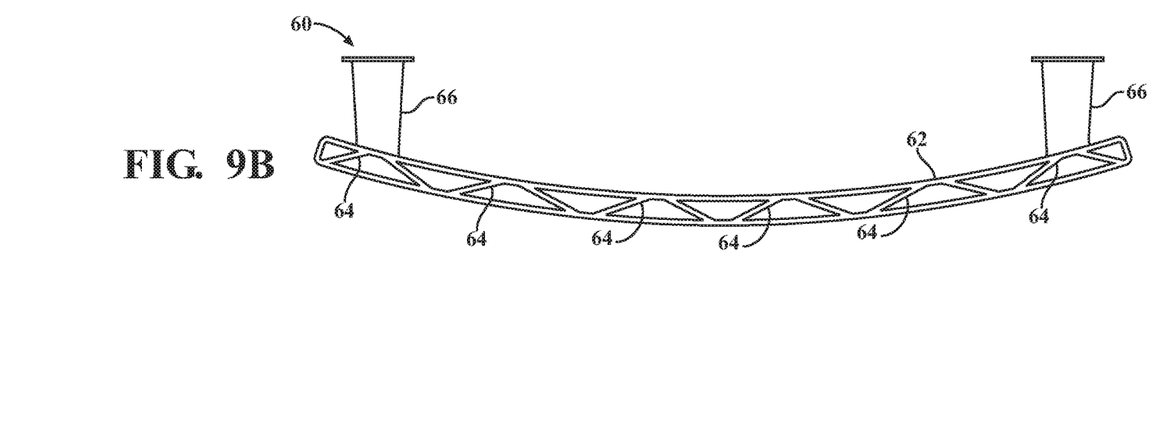
FIG. 9B is a top view of the sixth embodiment of the bumper system.
Figure 9C:
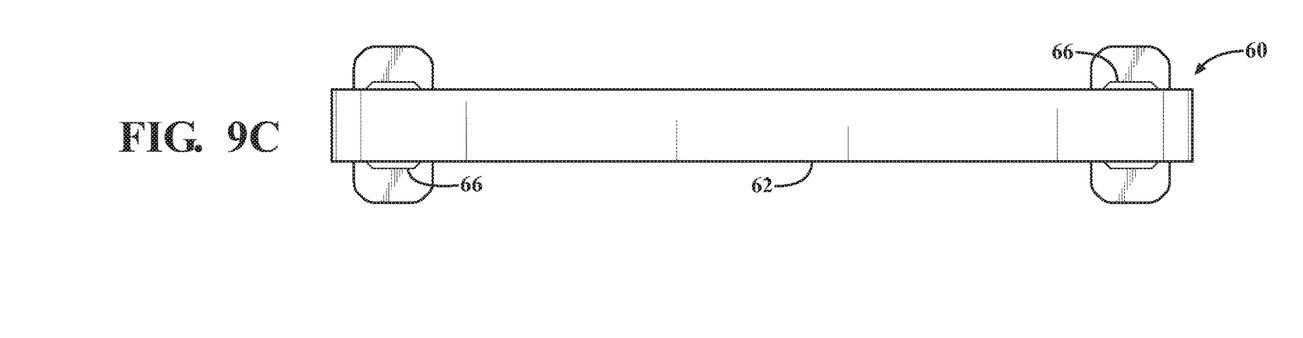
FIG. 9C is a front view of the sixth embodiment of the bumper system.
Figure 9D:
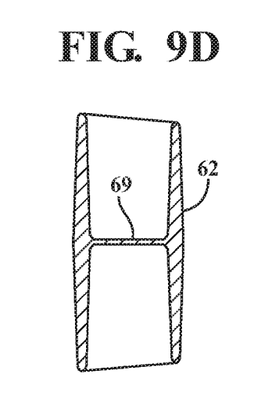
FIG. 9D is a cross-sectional view along C-C of FIG. 8A.
Figure 9E:
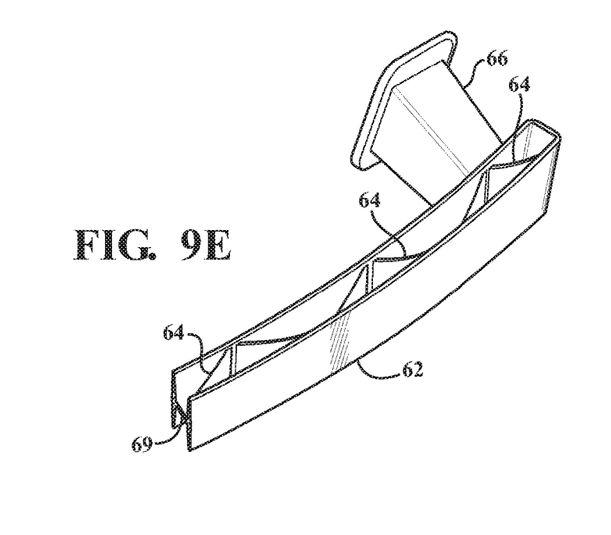
FIG. 9E is a partial perspective view of the sixth embodiment of the bumper system.

As best shown in FIGS. 9A-9B and 9E, the cast bumper beam 62 is open along a top and bottom portion of the bumper system 60, while the cast crash box 66 is closed along these same portions. As best shown in FIGS. 9A-9B and 9E, the cast bumper beam 62 can include a plurality of reinforcing ribs 64 having a "V" shape that are each cast integrally with the cast bumper beam 62. However, it should be appreciated that the "V"-shaped reinforcing ribs 64 could also be any number of other shapes depending on the design criteria selected including, without limitation, the amount of structural support desired, weight, and/or the amount of desired crush. As best shown in FIGS. 9D and 9E, similar to the fifth embodiment, the cast bumper beam 62 can also be cast to have an "H" shape and define an additional horizontal or transverse rib 69 extending along at least a portion of the length to further control the crash properties of the bumper system 60.

Figure 10A:
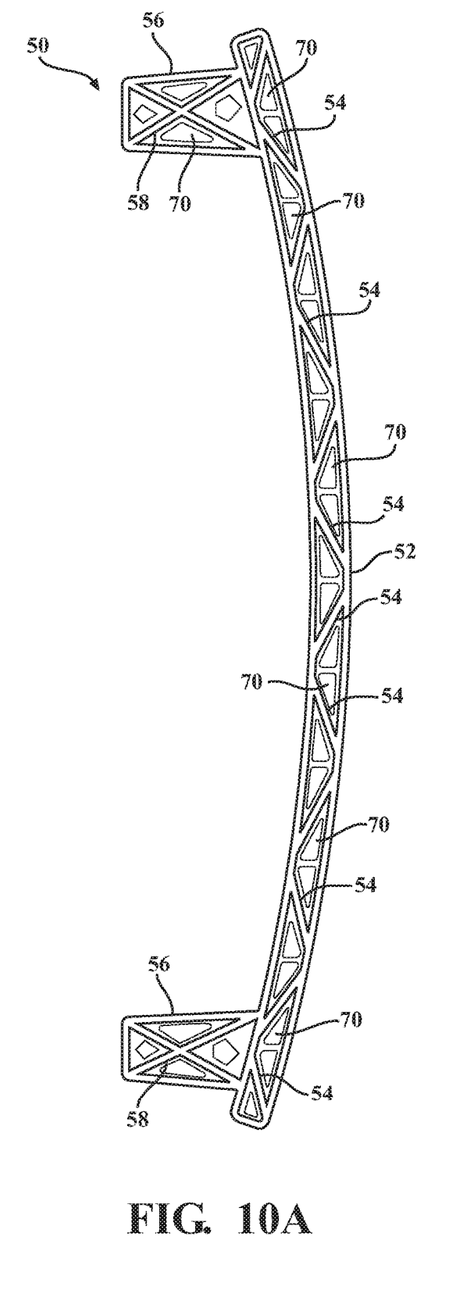
FIG. 10A is a top view of the bumper system shown in FIG. 8A illustrating a plurality of weight reduction holes defined by the H-shaped cast bumper beam and the cast crash box.
Figure 10B:
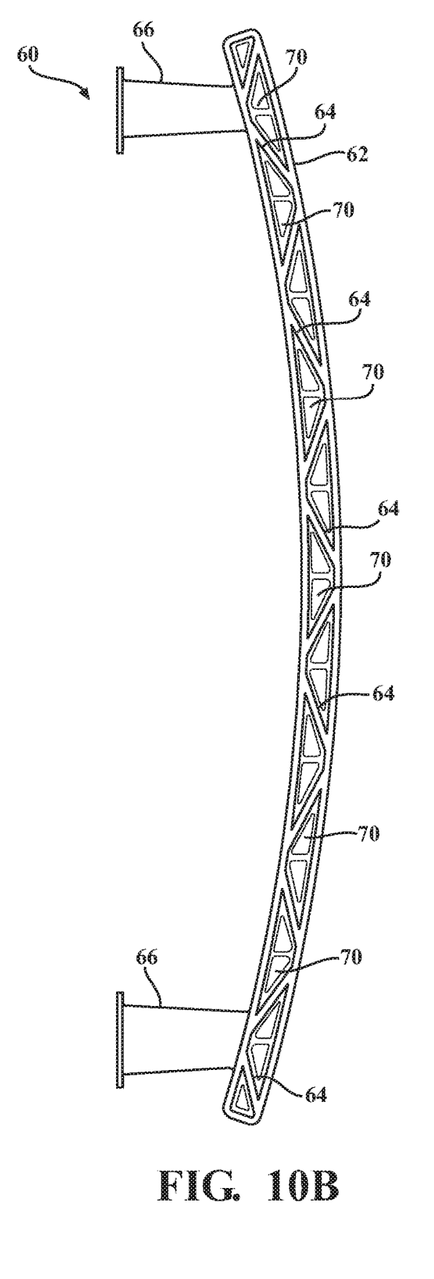
FIG. 10B is a top view of the bumper system shown in FIG. 9A illustrating a plurality of weight reduction holes defined by the H-shaped cast bumper beam.

FIGS. 10A and 10B illustrate an alternative arrangement of the fifth and sixth embodiments of the bumper system 50, 60, respectively, in which the horizontal or transverse rib 59, 69 of the bumper beam 52, 62 defines a plurality of weight reduction holes 70 to further reduce the overall weight of the cast bumper system 50, 60. As shown in FIG. 10A, in the alternative arrangement of the fifth embodiment of the bumper system, the cast crash box 56 can also define a plurality of weight reduction holes to even further reduce the overall weight of the cast bumper system 50.

According to an aspect of the subject disclosure, any of the aforementioned embodiments of the subject bumper system may be manufactured such that they are comprised of multiple grades of alloys at various regions or portions of the metal cast bumper system to allow the bumper system to be efficiently tuned to meet certain vehicle performance requirements. More specifically, as illustrated in FIGS. 11 and 12, the bumper system 70, 80 may be divided into a plurality of regions or portions A, B, C, D, E, F, G with at least two of the regions or portions A, B, C, D, E, F, G comprised of different alloys than one another such that each region or portion A, B, C, D, E, F, G may be specialized and tuned for predetermined performance and mass characteristics.

Figure 11:
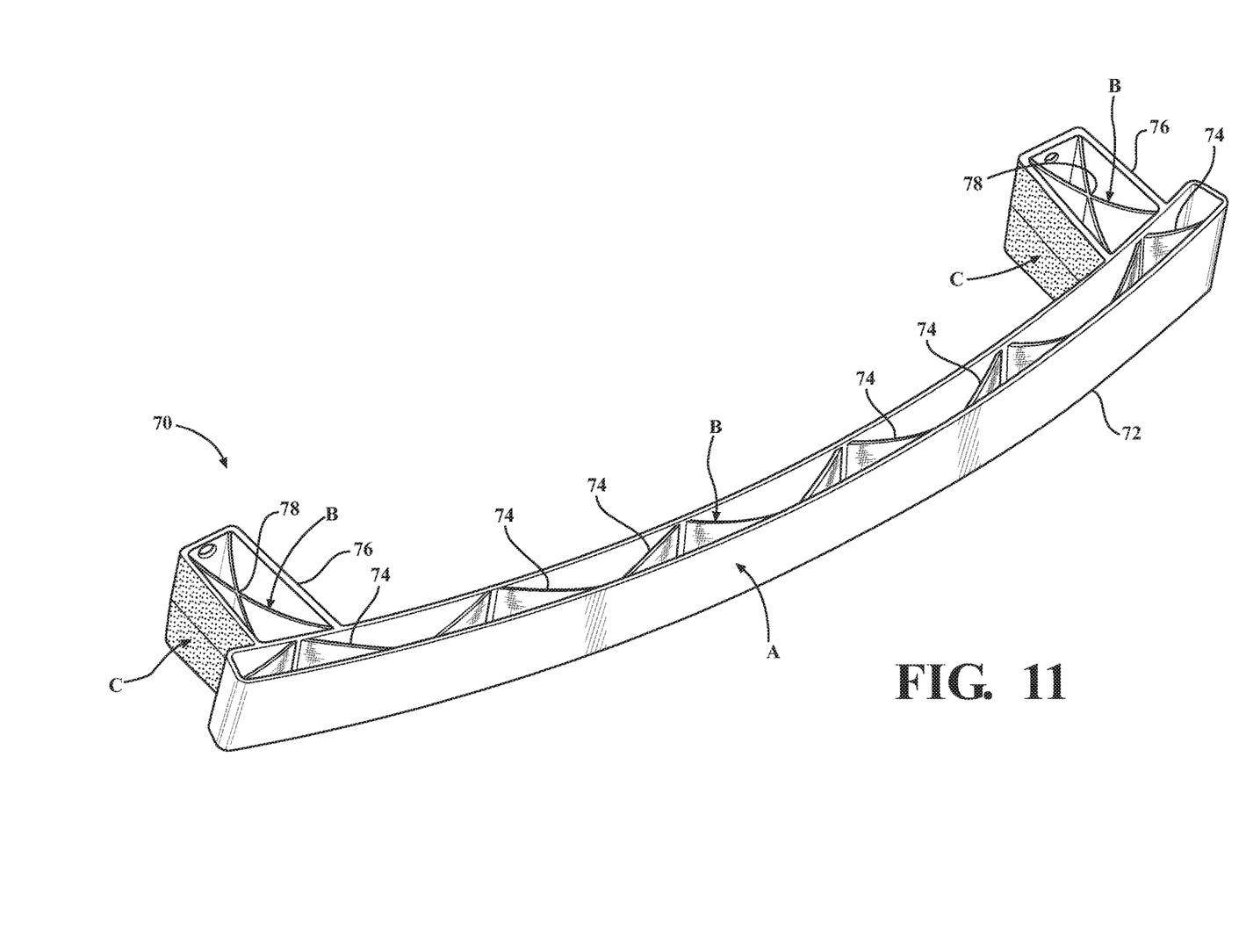
FIG. 11 is a perspective view of a seventh embodiment of the bumper system wherein the bumper system is comprised of several regions or portions each comprised of a different metal alloy.
Figure 12:
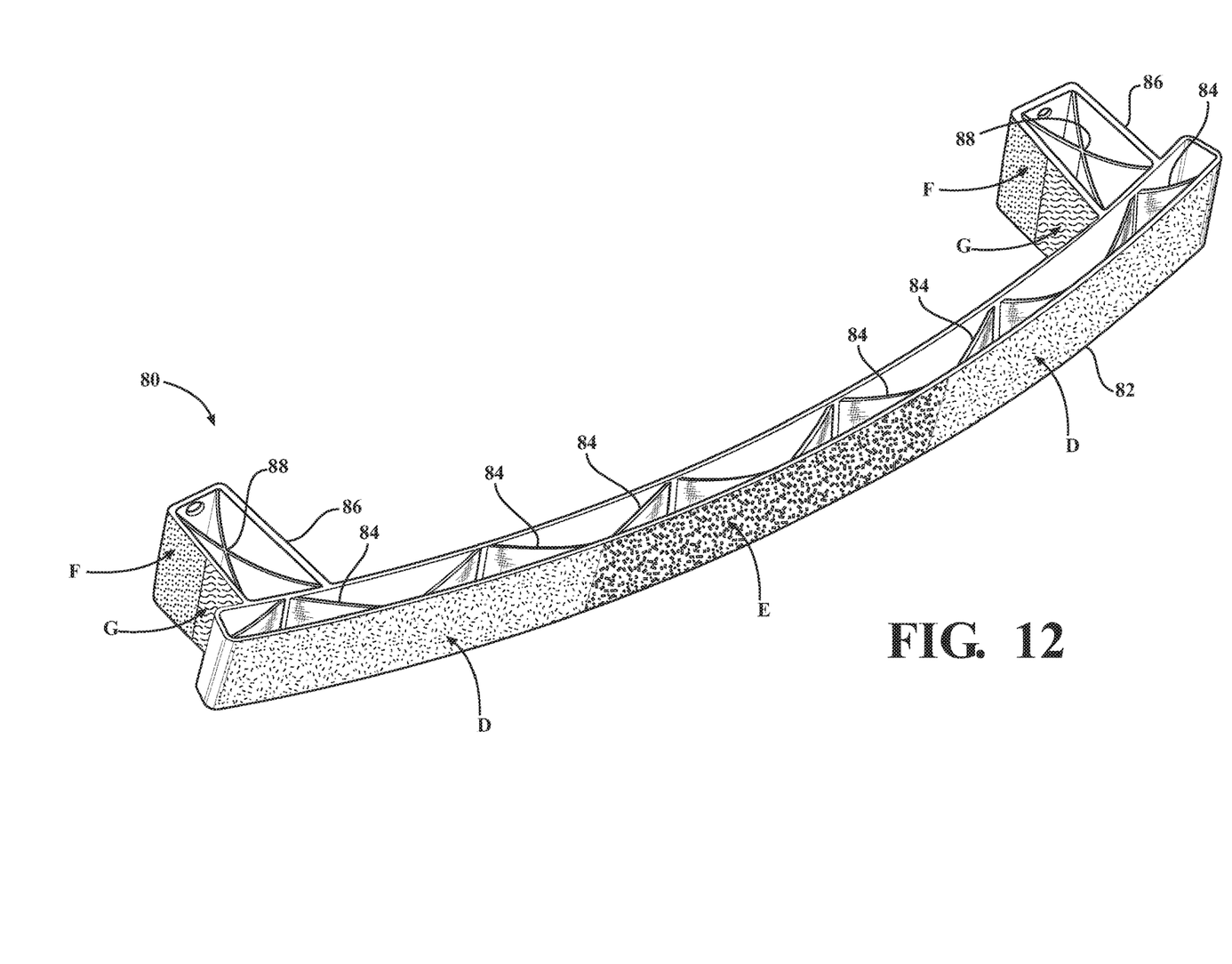
FIG. 12 is a perspective view of an eighth embodiment of the bumper system wherein a cast bumper beam is comprised of at least two regions or portions, a crash box is comprised of at least two regions or portions, and wherein each of the regions or portions are comprised of a different alloy.

In the embodiment of FIG. 11, a metal cast bumper beam 72 makes up the first region A, a plurality of cast reinforcing ribs 74, 78 of the metal cast bumper beam 72 or metal cast crash boxes 76 make up the second region B, and a part of the metal cast crash boxes 76 makes up the third region C. In this example, an alloy that has excellent crush and energy absorbing characteristics can be selected for the second region B (the reinforcing ribs 74, 78), or other parts of the system that will be crushed on impact. Additionally, an alloy that has higher strength can be selected for the first region A (the bumper beam 72), or other parts of the bumper system 70 that are intended to transfer energy instead of absorb energy. As such, FIG. 11 demonstrates that different components of the metal cast bumper system 70 can be comprised of different alloys than one another. It should be appreciated that in this and the other embodiments of the subject invention, the cast bumper beam 72 and crash box 76 may either be integrally connected or non-integrally connected, e.g., mechanically connected, to one another.

Furthermore, individual components of the metal cast bumper system can be comprised of more than one region or portion of different alloys. For example, as illustrated in FIG. 12, the cast bumper beam 82 includes a first bumper beam portion E at a central region of the cast bumper beam 82 and which is comprised of a first bumper beam alloy. The cast bumper beam 82 also includes a second bumper beam portion D that is located at the outer regions of the bumper beam 82 on opposing sides of the central region E, and which is comprised of a second bumper beam alloy. The first and second bumper beam alloys are different than one another to refine and tune the performance characteristics of the metal cast bumper system 80. Furthermore, a pair of cast crash boxes 86 each include a first crash box region F that is located at a rearward region of the crash box 86 and comprised of a first crash box alloy. The pair of cast crash boxed 86 each also include a second crash box region G that is located at a forward region of the crash box 86 between the rearward region F and the bumper beam 82 and comprised of second crash box alloy. The first and second crash box alloys are different than one another as well as the first and second bumper beam alloys to refine and tune the performance characteristics of the metal cast crash boxes 86. As such, the metal cast crash boxes 86 are configured to have different performance characteristics across their lengths.

It should be appreciated that various other components and/or combinations of components can comprise regions or portions of different alloys and more than two different regions or portions can extend along the metal cast bumper beam. It should also be appreciated that various alloys may be utilized including, but not limited to, aluminum-based, e.g., 5000, 6000, or 7000 series aluminum alloys, magnesium-based, and iron-based alloys.

Although not expressly shown in the Figures, one or both of the bumper beam or the crash box in any of the aforementioned embodiments of the bumper system can also be cast to incorporate various design features including but not limited to: head lamps, ambient air sensors, pedestrian brackets, collision avoidance sensors, a hood latch, pedestrian protection systems, horns, grilles, fog lamps, toe hooks, threaded inserts, and neoprene shock absorption materials. As such, the cast bumper system can incorporate design features and shapes that would otherwise have to be welded onto prior art bumper assemblies, or stretch bent into prior art bumper assemblies. Thus, the cast bumper system avoids the machining and welding operations that are required to incorporate these features into prior art bumper assemblies manufactured by way of extrusion, steel roll forming, hot stamping, or the like.

Although not expressly shown in the figures, the cast bumper beam in any of the aforementioned embodiments of the bumper system can also be cast to have a "U"-shape or "C"-shape extending along a portion of its length.

Although not expressly shown in the Figures, one or both of the bumper beam or the crash box in any of the aforementioned embodiments of the bumper system can also include absorption inserts placed anywhere within or along the bumper system.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed:

1. A bumper system comprising:
a bumper beam cast from metal;
said metal cast bumper beam including at least a first portion comprised of a first alloy, a second portion comprised of a second alloy being different than said first alloy, and a third portion comprised of a third alloy being different that said first and second alloys.

2. A bumper system as set forth in claim 1 further including a crash box mechanically connected to said metal cast bumper beam.

3. A bumper system as set forth in claim 1 further including a crash box cast from metal and integrally formed with said metal cast bumper beam.

4. A bumper system as set forth in claim 3 wherein said metal cast crash box is comprised of a first crash box alloy being different than said first, second, and third alloys of said metal cast bumper beam.

5. A bumper system as set forth in claim 4 wherein said metal cast crash box includes a first crash box portion comprised of said first crash box alloy and a second crash box portion comprised of a second crash box alloy being different than said first crash box alloy.

6. The bumper system as set forth in claim 5 wherein said first crash box portion includes a rearward portion of said crash box and said second crash box portion includes a forward portion of said crash box positioned adjacent to and forward of said rearward portion.

7. A bumper system as set forth in claim 1 wherein said first portion includes a central portion of said metal cast bumper beam, and said second portion includes a pair of outer portions of said metal cast bumper beam disposed on opposing sides of said central portion.

8. A bumper system as set forth in claim 7 wherein said third portion includes a plurality of reinforcing ribs of said metal cast bumper beam.

9. A bumper system comprising:
a bumper beam;
a crash box;
said crash box and said bumper beam being integrally cast from metal;
said bumper beam including at least a first bumper beam portion comprised of a first bumper beam alloy; and
said crash box including at least a first crash box portion comprised of a first crash box alloy being different than said first bumper beam alloy.

10. A bumper system as set forth in claim 9 wherein said bumper beam further includes a second bumper beam portion comprised of a second bumper beam alloy being different than said first bumper beam alloy and said first crash box alloy.

11. A bumper system as set forth in claim 10 wherein said crash box further includes a second crash box portion comprised of a second crash box alloy being different than said first bumper beam alloy, said first crash box alloy and said second bumper beam alloy.

12. A bumper system as set forth in claim 11 wherein said first bumper beam portion includes a central portion of said metal cast bumper beam, and said second portion includes a pair of outer portions of said metal cast bumper beam disposed on opposing sides of said central portion.

13. A bumper system as set forth in claim 12 wherein said bumper beam includes a third bumper beam portion comprised of a third bumper beam alloy being different than said first and second bumper beam alloys.

14. A bumper system as set forth in claim 9 wherein said crash box further includes a second crash box portion comprised of a second crash box alloy being different than said first bumper beam alloy and said first crash box alloy.

15. A bumper system as set forth in claim 14 wherein one of said first or second crash box portions includes a plurality of reinforcing ribs of said crash box.

16. A method of manufacturing a bumper system comprising:
metal casting a bumper beam having at least a first portion comprised of a first alloy, a second portion comprised of a second alloy being different than the first alloy, and a third portion comprised of a third alloy being different than the first and second alloys.

17. A method as set forth in claim 16 further including mechanically connecting a crash box to the metal cast bumper beam.

18. A method as set forth in claim 16 further including metal casting a crash box integral to the metal cast bumper beam.

19. A method of manufacturing a bumper system as set forth in claim 18 wherein said metal casting the crash box integral to the metal cast bumper beam includes metal casting a first crash box portion comprised of a first crash box alloy and a second crash box portion comprised of a second crash box alloy that is different than the first crash box alloy.

20. A method of manufacturing a bumper system as set forth in claim 19 wherein the first crash box portion is a rearward portion of the crash box and wherein the second crash box portion is a forward portion of the crash box being positioned adjacent to and forward of the rearward portion.

21. A method as set forth in claim 16 wherein the first portion includes a central portion of the metal cast bumper beam and the second portion includes a pair of outer portions of the metal cast bumper beam disposed on opposing sides of the central portion.

22. A method of manufacturing a bumper system comprising:
metal casting a bumper beam and a crash box integrally with one another, wherein the metal cast bumper includes at least a first bumper beam portion comprised of a first bumper beam alloy and the metal cast crash box includes at least a first crash box portion comprised of a first crash box alloy being different than the first bumper beam alloy.

23. A method of manufacturing a bumper system as set forth in claim 22 wherein the metal cast bumper beam further includes a second bumper beam portion comprised of a second bumper beam alloy being different than the first bumper beam alloy and the first crash box alloy.

24. A method of manufacturing a bumper system as set forth in claim 22 wherein the metal cast crash box further includes a second crash box portion comprised of a second crash box alloy being different than the first bumper beam alloy and the first crash box alloy.

* * * * *